United States Patent [19]

Wang

[11] Patent Number: 5,033,113
[45] Date of Patent: Jul. 16, 1991

[54] INFRARED RECEIVER SYSTEM FOR A REMOTE CONTROL CEILING FAN

[76] Inventor: Susan Wang, No. 189-1, Sec. 1, Tung Shan Rd., Taichung City, Taiwan

[21] Appl. No.: 359,633

[22] Filed: May 31, 1989

[51] Int. Cl.⁵ .............................................. H04B 10/00
[52] U.S. Cl. .................................. 455/603; 318/16; 416/5
[58] Field of Search ............... 455/603, 619; 416/5; 318/16

[56] References Cited

U.S. PATENT DOCUMENTS 4,818,920  4/1989  Jacob ..................................... 318/16

FOREIGN PATENT DOCUMENTS 0014536  1/1985  Japan ..................................... 455/603

Primary Examiner—Joseph A. Orsino
Assistant Examiner—Franklin V. Nguyen
Attorney, Agent, or Firm—Poms, Smith, Lande & Rose

[57] ABSTRACT

An infrared receiver system for a remote control ceiling fan including a connector disposed in a switch housing of a ceiling fan, an infrared detective sensor disposed in a casing which is connected to a plug by an extension cable. The plug is insertable into the connector of the switch housing for making an electrical connection between the plug and the connector. The detective sensor is located at a lower end of the casing such that the detective sensor is wide open for receiving signals in the undisturbed atmosphere below the ceiling fan.

1 Claim, 3 Drawing Sheets

INFRARED RECEIVER SYSTEM FOR A REMOTE CONTROL CEILING FAN

FIELD OF THE INVENTION

The present invention relates to an infrared receiver system, and more particularly to an infrared receiver system for a remote control ceiling fan.

BACKGROUND OF THE INVENTION

Remove control ceiling fans have been developed in recent years. For example, as shown in FIG. 3, two or more infrared receivers B are provided in a switch housing A of a remote control ceiling fan. The receivers B are distributed on the peripheral surface of the switch housing A for improving the signal receiving ability of the ceiling fan because of the directivity of the media, such as infrared rays. But, when giving a signal directly from under the switch housing A, the receiving effectiveness is bad. However, if the infrared receiver is provided on the lower surface of the switch housing A, it could work properly of course. But, there'll be no place to hang gorgeous light kit D. In this type of remote control ceiling fan, the receiver B is one of the most expensive elements. The cost is high and the signal receiving ability is still not improved.

The present invention has arisen to mitigate and/or obviate the afore-described disadvantages of the conventional remote control ceiling fan.

SUMMARY OF THE INVENTION

The primary object of the present invention is to provide an infrared receiver system for a remote control ceiling fan, which has a wider signal receiving angle and an undisturbed signal reception atmosphere.

Another object of the present invention is to provide an infrared receiver system for a remote control ceiling fan, which uses only one receiving sensor and provides better signal receiving ability.

Still another object of the present invention is to provide an infrared receiver system for a remote control ceiling fan, whose cost is reduced greatly.

Therefore, the present invention seeks to provide an infrared receiver system for a remote control ceiling fan including a connector disposed in a switch housing of a ceiling fan, an infrared detective sensor being disposed in a casing which is connected to a plug by an extension cable. The plug is insertable into the connector of the switch housing for making an electrical connection therebetween. The infrared detective sensor is located at the lower end of the casing such that the infrared detective sensor is located below a light kit and wide open for receiving signals in the undisturbed atmosphere below the remote control ceiling fan.

According to another aspect of the present invention, a spherical shaped transparent plastic cover is provided onto the lower end of the casing below the infrared detective sensor for concentrating the infrared beams to be detected.

Further objects and advantages of the present invention will become apparent from a careful reading of the detailed description provided hereinbelow, with appropriate reference to the accompanying drawings.

DETAILED DESCRIPTION OF THE INVENTION

Figure 1:
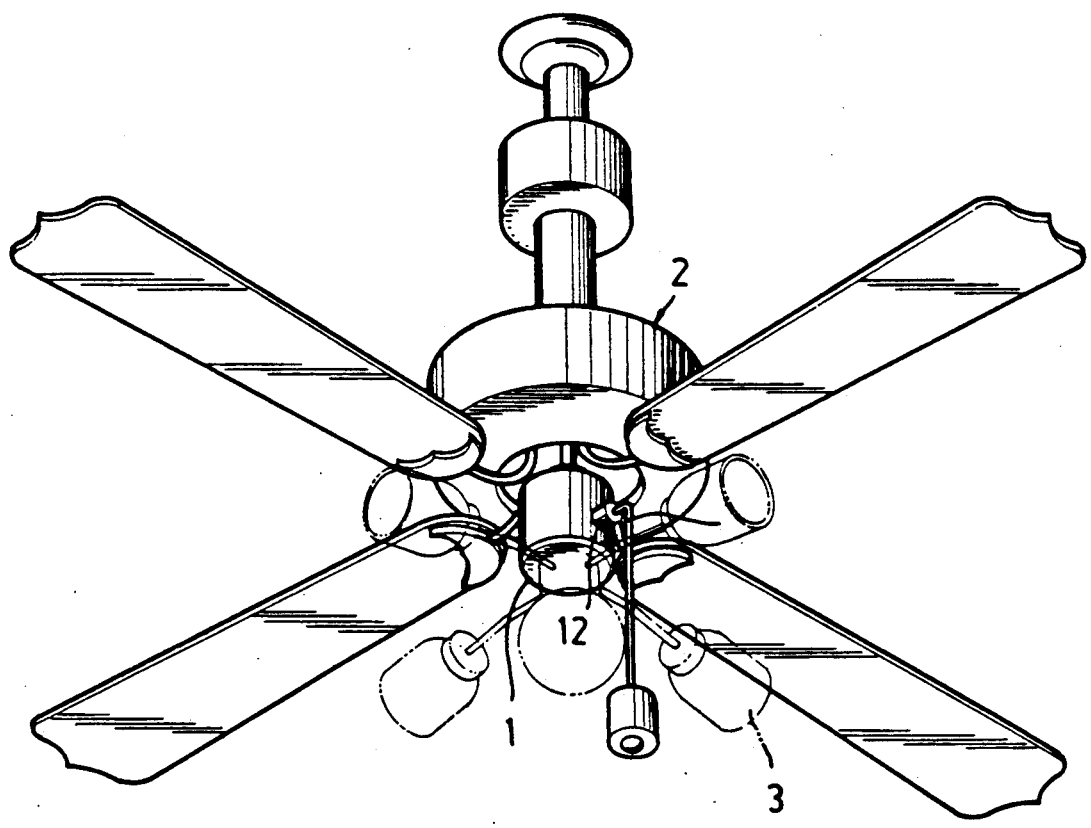
FIG. 1 is a perspective view of an infrared receiver system for a ceiling fan in accordance with the present invention.
Figure 2:
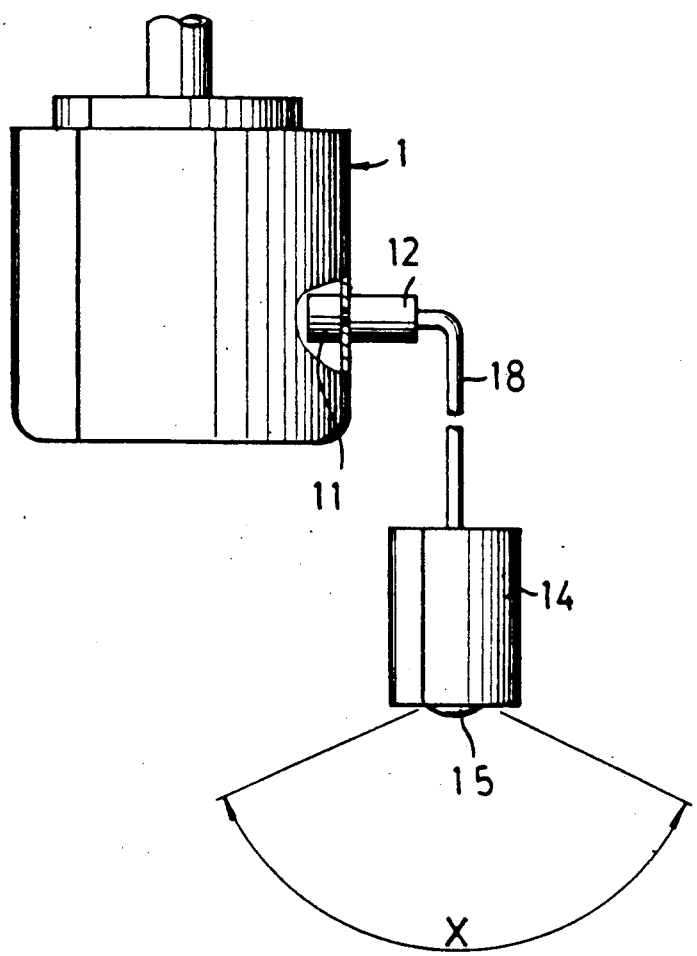
FIG. 2 is a plane view of a portion of the infrared receiver system of FIG. 1.
Figure 3:
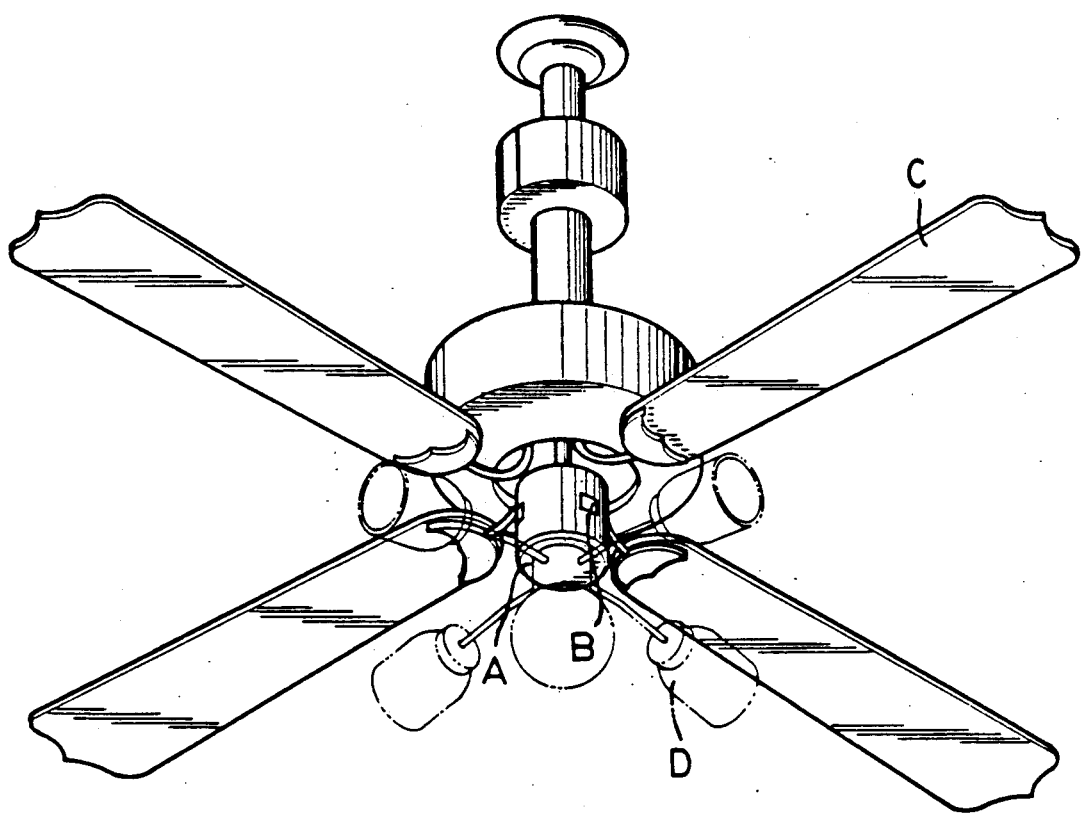
FIG. 3 is a perspective view of a conventional ceiling fan.

Referring to FIGS. 1 and 2, it can be seen that the infrared receiver system for a remote control ceiling fan 2 in accordance with the present invention comprising a connector 11 which is disposed within the switch housing 1 of the ceiling fan 2; a spherically shaped transparent plastic cover 15 being disposed onto a lower end of a casing 14 which is connected to a plug 12 by an extension cable 18; and an infrared receiver, more particularly an infrared detective sensor (not shown), being provided within the casing 14 above the spherically shaped transparent plastic cover 15. The spherically shaped transparent plastic cover 15 is substantially a convex lens and suitable for concentrating the infrared beams to be detected. The plug 12 is insertible into the connector 11 for making an electrical connection therebetween. If a light kit 3, as shown in image line in FIG. 1, is attached to the lower end of the switch housing 1, a longer extension cable 18 is used such that the transparent plastic cover as well as the infrared detective sensor are always located slightly below the light kit.

Alternatively, the extention cable 18 could be in the form of an adjustable cable whose length is adjustable in accordance with the height of the light kit 3 attached to the lower end of the switch housing 1 such that the transparent plastic cover 15 as well as the infrared detective sensor are always located slightly below the light kit 3.

Therefore, a coverage angle "X" (FIG. 2) of the detective sensor is wide open for receiving signals in the undisturbed atmosphere below the ceiling fan. The signal detective range and effectiveness are thus improved tremendously.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An infrared receiver system for a remote controlled ceiling fan comprising a connector disposed in a switch housing of a ceiling fan, an infrared detective means being connected to a plug by an extension cable, a casing being provided at a free end of said extension cable for accommodating said infrared detective means, a transparent plastic cover which is spherically shaped being disposed onto a lower end of said casing below said infrared detective means; said plug being insertable into said connector for making an electrical connection therebetween; said extension cable having a length which is determined according to a height of a light kit such that said infrared detective means is located slightly below a light kit which is attached to a lower end of said switch housing, and so tha said infrared detective means is wide open for receiving signals in an undisturbed atmosphere below said ceiling fan.

* * * * *